United States Patent
Manfreda et al.

(10) Patent No.: US 12,066,302 B2
(45) Date of Patent: Aug. 20, 2024

(54) VEHICLE LEVELING USING HANDHELD MOBILE DEVICE

(71) Applicant: Lippert Components, Inc., Mishawaka, IN (US)

(72) Inventors: John Peter Manfreda, St. Clair Shores, MI (US); Matthew A. Collin, Ferndale, MI (US); Tod Cunningham, New Hudson, MI (US)

(73) Assignee: Lippert Components, Inc., Mishawaka, IN (US)

( * ) Notice: Subject to any disclaimer, the term of this patent is extended or adjusted under 35 U.S.C. 154(b) by 374 days.

(21) Appl. No.: 17/380,288

(22) Filed: Jul. 20, 2021

(65) Prior Publication Data

US 2021/0372791 A1 Dec. 2, 2021

Related U.S. Application Data

(63) Continuation of application No. 16/865,611, filed on May 4, 2020, now Pat. No. 11,105,623.

(60) Provisional application No. 62/844,200, filed on May 7, 2019.

(51) Int. Cl.
| | |
|---|---|
| *G01C 9/04* | (2006.01) |
| *B60S 9/02* | (2006.01) |
| *G01B 5/24* | (2006.01) |
| *B60P 3/36* | (2006.01) |
| *B66F 7/24* | (2006.01) |
| *G05D 1/00* | (2006.01) |
| *G08C 17/00* | (2006.01) |

(52) U.S. Cl.
CPC ............... *G01C 9/04* (2013.01); *B60S 9/02* (2013.01); *G01B 5/24* (2013.01); *B60P 3/36* (2013.01); *B66F 7/24* (2013.01); *G05D 1/0891* (2013.01); *G08C 17/00* (2013.01)

(58) Field of Classification Search
CPC ..... B66F 3/46; B66F 7/24; B60S 9/02; G01C 9/04; G05D 1/0891
See application file for complete search history.

(56) References Cited

U.S. PATENT DOCUMENTS

| | | | |
|---|---|---|---|
| 5,143,386 A * | 9/1992 | Uriarte | B60S 9/02 180/41 |
| 6,584,385 B1 * | 6/2003 | Ford | B60G 17/0161 180/41 |
| 6,684,138 B1 * | 1/2004 | Friede | B60S 9/02 73/290 R |
| 10,343,653 B1 | 7/2019 | Garceau et al. | |
| 11,208,082 B1 | 12/2021 | Garceau et al. | |
| 11,854,380 B2 | 12/2023 | Garceau et al. | |

(Continued)

*Primary Examiner* — Frank B Vanaman
(74) *Attorney, Agent, or Firm* — Mechanicus PLLC

(57) ABSTRACT

A system and method for leveling a selected surface of a structure. The system includes a handheld mobile device and a platform leveling assembly (PLA) supportable on a structure to be leveled. The PLA includes a PLA controller and a PLA receiver communicatively coupled with the PLA controller. The handheld mobile device includes a tilt sensor configured to sense an attitude of a selected surface on which the handheld mobile device is placed; and a mobile device controller communicatively coupled to the tilt sensor and the transmitter and configured to receive signals from the tilt sensor indicating the attitude of the selected surface on which the handheld mobile device is placed.

13 Claims, 11 Drawing Sheets

(56) References Cited

U.S. PATENT DOCUMENTS

| | | |
|---|---|---|
| 2007/0172114 A1 | 7/2007 | Baker et al. |
| 2008/0142768 A1 | 6/2008 | Thorpe et al. |
| 2009/0189558 A1* | 7/2009 | Ford .................. B66F 3/44 318/400.38 |
| 2011/0112728 A1* | 5/2011 | Stacy ................ B66C 23/80 701/49 |
| 2018/0004230 A1 | 1/2018 | Leonard |
| 2018/0022325 A1* | 1/2018 | Garceau ............. B60S 9/02 180/41 |
| 2023/0234822 A1* | 7/2023 | Jaipaul .............. H04B 7/24 187/247 |

* cited by examiner

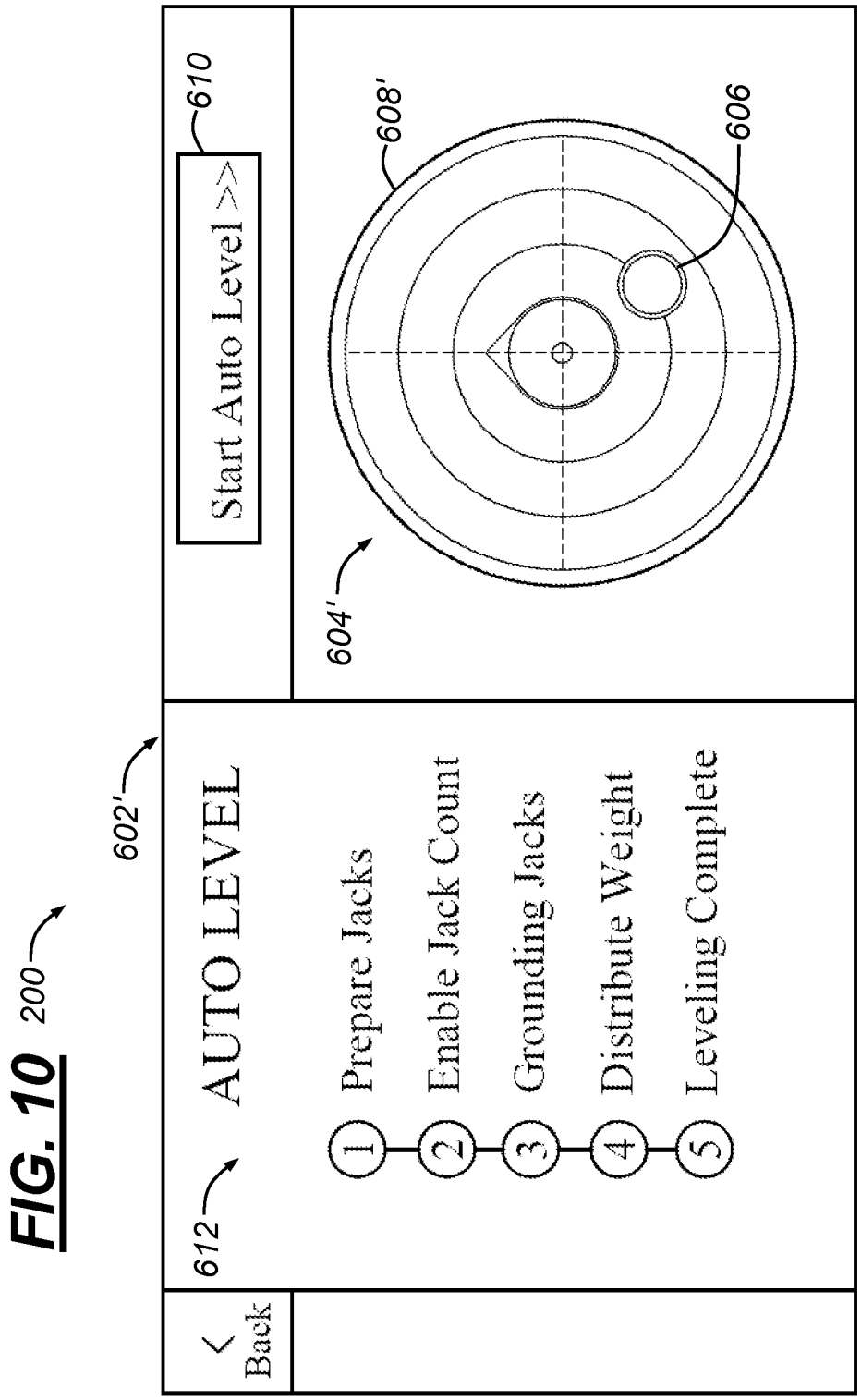

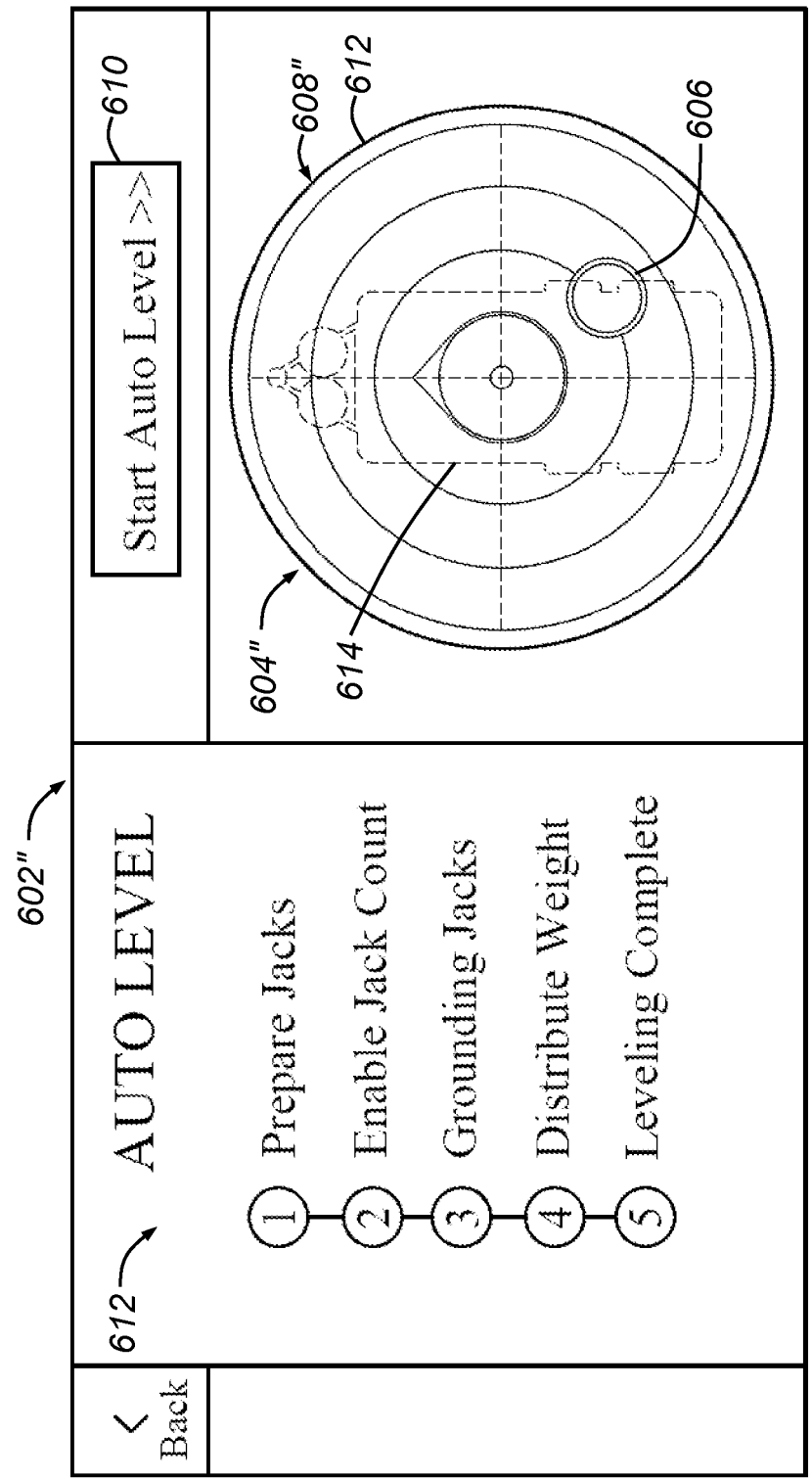

VEHICLE LEVELING USING HANDHELD MOBILE DEVICE

CROSS-REFERENCES TO RELATED APPLICATIONS

This application is a continuation of U.S. patent application Ser. No. 16/865,611, which claims priority in U.S. Provisional Patent Application Ser. No. 62/844,200 filed May 7, 2019, which is incorporated herein in its entirety, by reference.

FIELD

This application relates generally to leveling a surface and, more particularly, to leveling a selected surface of a vehicle such as a recreational vehicle (RV).

BACKGROUND

Certain vehicles, such as recreational vehicles (RVs), include leveling devices, such as electronically-controlled jacks, that are operable so as to level a surface or structure of the RV, such as the floor. Current systems rely on the use of integrated tilt sensors to detect platform level. A "zero-point" of the vehicle or other structure, which is the attitude or angle of the tilt sensor relative to true earth level that the leveling system will return to in order to level a desired portion of the structure, is typically programmed prior to first use of the system and, in some instances, may be programmed by a consumer, such as an owner or lessee, after manufacture and sale. This zero point is often set by placing a bubble level on a selected surface in the RV platform (e.g., kitchen counter, floor) that an end user would desire to be leveled in future automatic leveling operations, and then adjusting the leveling devices until the bubble level indicates the selected surface is level. Tilt sensor signal values representing the attitude of the tilt sensor when the bubble level indicates that the selected surface is level, are then saved as zero-point values to be referenced in future automatic leveling operations.

SUMMARY

A system is provided for leveling a selected surface of a structure. The system includes: a handheld mobile device and a platform leveling assembly (PLA) configured to be supported on the structure to be leveled. The PLA may include a PLA controller and a PLA receiver communicatively coupled with the PLA controller. The PLA controller is configured to be communicatively coupled with one or more leveling devices and configured to send, to the leveling device(s), leveling device commands that, when received by the leveling device(s), cause the leveling device(s) to change the attitude of the structure. The PLA receiver is configured to receive wireless signals carrying a leveling device instruction and to send the leveling device instruction to the PLA controller. The handheld mobile device may include: a tilt sensor configured to sense an attitude of a selected surface on which the handheld mobile device is placed; an output device configured to provide an indication to a user; an input device configured to receive input from the user; a transmitter configured to send wireless signals to the PLA receiver; and a mobile device controller communicatively coupled to the tilt sensor and the transmitter and configured to receive signals from the tilt sensor indicating the attitude of the selected surface on which the handheld mobile device is placed. The system is configured to carry out an automatic leveling process that includes: obtaining a first attitude of the selected surface on which the handheld mobile device is placed, wherein the first attitude of the selected surface is obtained from the tilt sensor of the handheld mobile device; generating a leveling device command based on the first attitude of the selected surface on which the handheld mobile device is placed; operating at least one of the one or more leveling devices according to the leveling device command; after operating the at least one leveling device, obtaining a second attitude of the selected surface on which the handheld mobile device is placed, wherein the second attitude of the selected surface is obtained from the tilt sensor of the handheld mobile device; and determining whether the second attitude of the selected surface on which the handheld mobile device is placed indicates that the selected surface is level.

There is also provided a method of leveling a selected surface of a structure. The method includes the steps of: obtaining a first attitude of the selected surface on which the handheld mobile device is placed, wherein the first attitude of the selected surface is obtained from a tilt sensor of a handheld mobile device; (b) generating a leveling device command based on the first attitude of the selected surface on which the handheld mobile device is placed; (c) operating one or more leveling devices attached to the structure according to the leveling device command; (d) after operating the one or more leveling devices, obtaining a second attitude of the selected surface on which the handheld mobile device is placed, wherein the second attitude of the selected surface is obtained from the tilt sensor of the handheld mobile device; (e) determining whether the selected surface is level based on the second attitude of the selected surface on which the handheld mobile device is placed; and (f) when it is determined that the selected surface is not level, carrying out another iteration of steps (b)-(e).

BRIEF DESCRIPTION OF DRAWINGS

One or more embodiments will be described in conjunction with the appended drawings, in which like designations denote like elements, and in which:

FIG. 10 is a block diagram showing another embodiment of an automatic leveling screen of a graphical user interface that may be provided by the handheld mobile device; and FIG. 11 is a block diagram showing yet another embodiment of an automatic leveling screen of a graphical user interface that may be provided by the handheld mobile device.

DETAILED DESCRIPTION

There is provided a system and method for leveling a selected surface of a structure, such as for leveling a selected surface of a recreational vehicle (RV) or other vehicle. The system and method provided herein improves upon conventional platform leveling systems by using a tilt sensor that is a part of a handheld mobile device (e.g., smartphone) for purposes of leveling the selected surface of the structure. The handheld mobile device can be placed onto a selected surface, and the tilt sensor of the handheld mobile device can be used to determine whether the handheld mobile device is level (i.e., level relative to true earth level) thereby indicating whether the selected surface is level. The handheld mobile device can also include an input device that allows a user to provide one or more input commands or instructions that are then sent to the platform leveling assembly (PLA). The PLA may then generate one or more leveling device commands that cause one or more leveling devices (e.g., electronically-controlled jack(s)) to be operated according to the input provided by the user. The handheld mobile device can also include an output device that provides an indication of an attitude (relative to true earth level) of the handheld mobile device (and also the selected surface on which the handheld mobile device is placed) as measured by the tilt sensor of the handheld mobile device. This output device can be used to provide feedback to the user as to whether the selected surface is level, such as by digitally displaying a virtual bubble level; in such embodiments, for example, the user can then use the input device to provide manual leveling device instructions that are then communicated to the PLA, which then causes the leveling device(s) to be operated so as to adjust the attitude of the selected surface. This simplifies use of the system as the user need not carry around a physical bubble level, but can simply use the handheld mobile device, which can be, for example, the user's smartphone.

The handheld mobile device may be used to receive a zero-point set command from a user and then to send a corresponding zero-point set command signal to the PLA. In response to receiving the zero-point set command signal, the PLA stores an attitude reference value. The attitude reference value may be based on the attitude of the selected surface as measured by the tilt sensor of the handheld mobile device and/or the attitude of the structure that carries the PLA as measured by a PLA tilt sensor that is a part of the PLA. The PLA may be configured such that, when an automatic leveling device instruction is received from a user, the PLA causes the one or more leveling devices to operate until the selected surface is level—which may be indicated by the attitude reference value equaling or otherwise corresponding to an attitude of the PLA as measured by the PLA tilt sensor.

Figure 1:
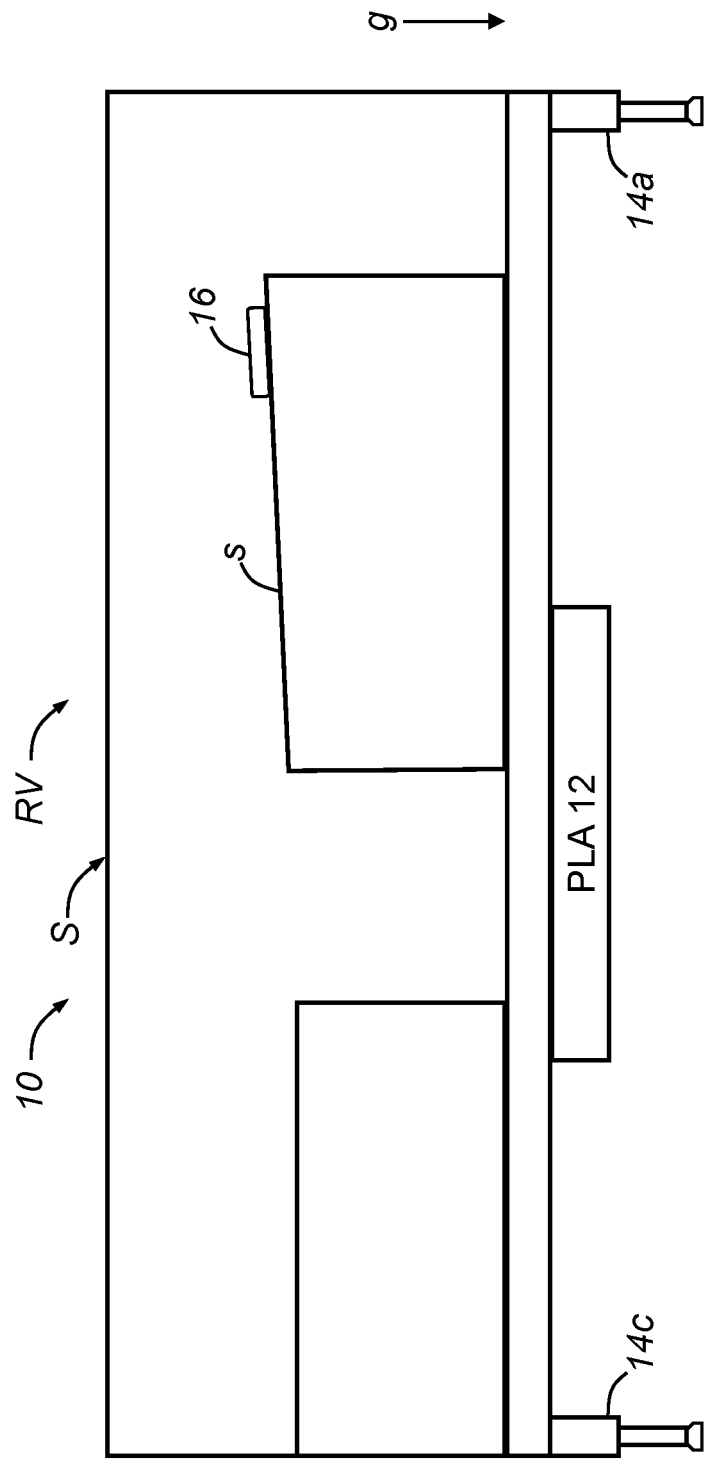
FIG. 1 is a diagrammatic side view of a structure and a system for leveling a selected surface of the structure according to a first embodiment.
Figure 2:
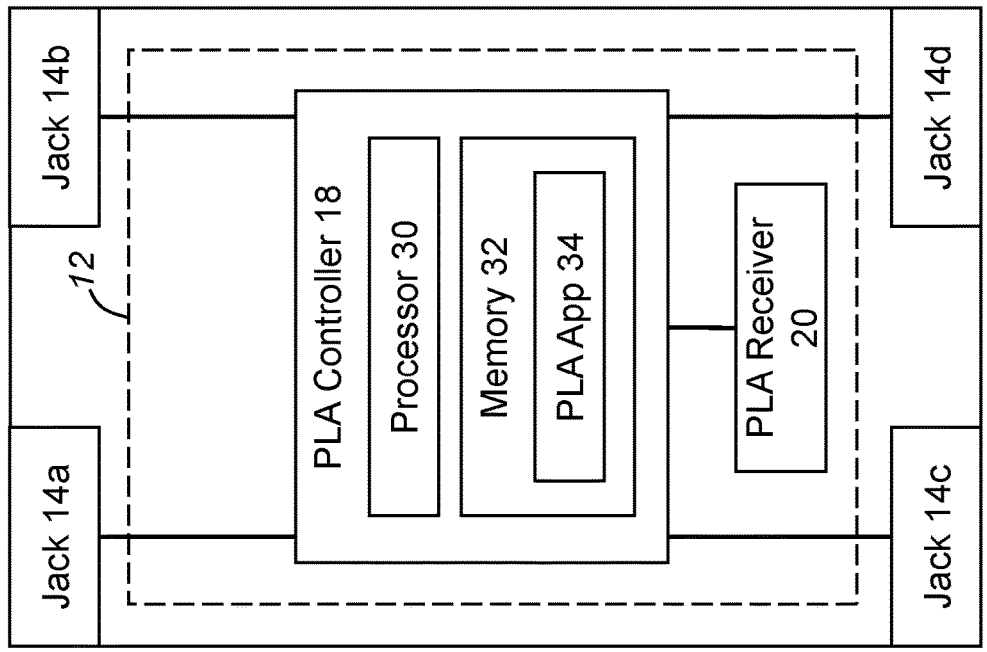
FIG. 2 is a block diagram showing a system for leveling a selected surface of a structure according to the first embodiment.
Figure 2:
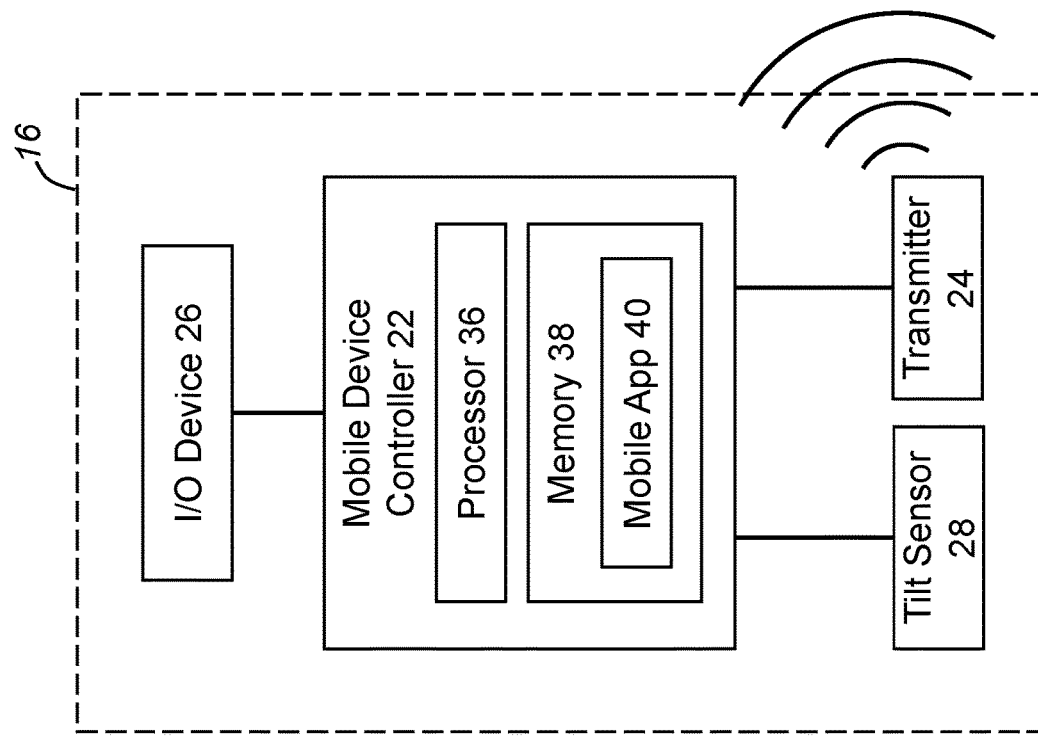

With reference to FIGS. 1-2, there is shown an embodiment of a system 10 for leveling a selected surface s of a structure S. The system 10 includes a platform leveling apparatus (PLA) 12 used to operate one or more leveling devices 14 carried by the structure S, and a handheld mobile device (e.g., smartphone) 16 that may be used to send instructions or other information to the PLA 12. To level a selected surface s of a structure S, the PLA 12 may first be installed in the structure S and connected to the leveling devices 14, and then, as shown in FIG. 1, the handheld mobile device 16 may be placed on a selected surface s such as a kitchen countertop of a recreational vehicle RV. The user can then use the system 10 and method discussed below to level the selected surface s by causing the PLA to command the leveling devices 14 to move the structure S into an attitude where the selected surface s is level relative to true earth level or parallel to (or coplanar with) a plane that is perpendicular to earth's gravity g.

As shown in FIG. 2, the PLA 12 may include a PLA controller 18 and a PLA receiver 20 that may be configured to receive electronic data from the handheld mobile device 16. The handheld mobile device 16 may include a mobile device controller 22, a transmitter 24, an input/output (I/O) device 26, and a tilt sensor 28 that is used to obtain a tilt of the handheld mobile device 16 relative to true earth level. The handheld mobile device 16 may be configured to transmit information using the transmitter 24 to the PLA 12, which may receive the transmitted information using the PLA receiver 20. The PLA controller 18 of the PLA 12 may be configured to obtain the received information from the PLA receiver 20, which may be used to adjust the attitude of the structure S through actuating the one or more leveling devices 14.

The one or more leveling devices 14 are illustrated and described herein as being a plurality of electronically-controlled jack, but other leveling devices for leveling the structure S can be used. As shown in the illustrated embodiment of FIG. 2, four jacks 14a-d may be located at the corners of the structure S; however, according to other embodiments, a different number, arrangement, and/or configuration of leveling devices can be used. In the illustrated embodiment, the four jacks 14a-d include a left-front jack 14a, a right-front jack 14b, a left-rear jack 14c, and a right-rear jack 14d.

Each jack 14a-d may be electronically operable and controlled by the PLA controller 18 through sending leveling device commands to each of the jacks 14a-d. Each jack 14a-d can be any device that can extend or retract a piston or arm through use of, for example, pneumatic, hydraulic, and/or electric power. Each jack 14a-d may include a position sensor and a direct current motor. The position sensors can be located and configured to sense the positions of jack piston or other jack component to determine the amount of jack extension in respective jacks 14a-d. The DC motors of each of the jacks 14a-d can be used to actuate their respective jacks between respective fully retracted and fully extended positions. The jacks 14a-d may be configured to each receive respective extension commands that command the jacks 14a-d to use their respective DC motors to extend the jacks 14a-d. Likewise, the jacks 14a-d may be configured to each receive respective retraction commands that command the jacks to use their respective DC motors to retract the jacks.

The PLA controller 18 may include a processor 30 and memory 32 for storing computer instructions in the form of PLA application 34. As used herein, the term "computer instructions" may include any instructions that are readable or executable by an electronic computer or processor, which may include, for example, control logic, computer software and/or firmware, programmable instructions, or other suitable instructions. The PLA controller 18 may be configured so that, when the PLA application 34 is executed using the processor 30, the PLA controller 18 carries out one or more steps of the method described below. The PLA controller 18 may be communicatively coupled to the PLA receiver 20 such that the PLA controller 18 is able to receive data that was transmitted as wireless signals and received at the PLA receiver 20. The PLA controller 18 may be communicatively coupled to the jacks 14*a-d* so as to control actuation and/or operation of the jacks 14*a-d*. The PLA controller 18 may be configured to change the attitude of the structure S in response to receiving leveling device instructions from a user of the PLA 12 or the handheld mobile device 16. The leveling device instructions can be manual leveling device instructions or automatic leveling device instructions. A manual leveling device instruction specifies one or more leveling devices to be operated and an automatic leveling device instruction indicates that an automatic leveling process that levels the structure according to a zero-point or other predefined reference value is to be carried out.

The PLA receiver 20 may be any suitable hardware that is able to receive signals transmitted by the transmitter and may be a wireless receiver that may be configured to receive electromagnetic signals used for wireless communication, such as short-range wireless communications (SRWCs) and/or long-range wireless communications (LRWCs) (e.g., cellular communications). The PLA receiver 20 may include an antenna (not shown) and receiver circuitry that may be used to receive wireless signals and process the received wireless signals. The PLA receiver 20 may be embodied as a transceiver that may be used to transmit and receive wireless signals and, the PLA receiver 20 may be part of a wireless communications module that may be configured to carry out SRWCs and/or LRWCs. The PLA 12 may establish with the handheld mobile device 16 an SRWC connection that can be established using any of a variety of SRWC technologies, including, for example, Wi-Fi™, Bluetooth™, other IEEE 802.11 protocols, ZigBee™, Z-Wave™, etc.

The handheld mobile device 16 may be a modern, personal mobile device, such as a smartphone (e.g., Samsung Galaxy S10™, iPhone™, Google Pixel™) or a tablet (e.g., iPad™). The mobile device controller 22 of the handheld mobile device 16 may include a processor 36 and memory 38 storing computer instructions in the form of a mobile application 40. The mobile device controller 22 may be configured so that, when the mobile application 40 may be executed using the processor 36, the mobile device controller 22 carries out one or more steps of any one or more implementations of the method described below. The mobile device controller 22 may be communicatively coupled to the transmitter 24 such that the mobile device controller 22 is able to direct or cause the transmitter 24 to transmit data in the form of wireless signals. The mobile device controller 22 may be communicatively coupled to the tilt sensor 28 such that the mobile device controller 22 receives tilt sensor information from the tilt sensor 28, which may represent or be used to generate an attitude of the handheld mobile device.

The mobile device controller 22 may be communicatively coupled to the input device 28 so as to receive information or data indicating input received at the input device 28. In the illustrated embodiment, the mobile device controller 22 may be communicatively coupled to the transmitter 24, the tilt sensor 28, and the input device 28 via a wired connection, which can be in the form of a controller area network (CAN), a local interconnect network (LIN) bus, Ethernet connection, and/or other hardwired connection. However, in other embodiments, the mobile device controller 22 may be communicatively coupled to the transmitter 24, the tilt sensor 28, and/or the input device 28 via a wireless connection, such as through use of SRWCs (e.g., Wi-Fi™ Bluetooth™).

The mobile application 40 may include computer instructions that, when executed by the processor 36, cause and/or enable the handheld mobile device 16 to perform one or more of the following: (i) communicate with the PLA 12 via a wireless connection through use of the transmitter 24 and the PLA receiver 20 of the PLA 12; (ii) determine an attitude of the handheld mobile device 16 relative to true earth level through use of the tilt sensor 28; (iii) transmit attitude information, including the determined attitude, to the PLA 12; (iv) automatically program the zero-point of the PLA 12 using the attitude of the handheld mobile device 16 as a zero point; and/or (v) provide a mobile user interface to the user so that the user is able to use the mobile user interface to command and augment leveling operations, which may be manual or automatic. The mobile application 40 may be downloadable from a mobile app distribution platform, such as Google Play™, App Store (iOS™), Microsoft™ Store, and/or Samsung Galaxy™ Apps.

The mobile application 40 may include computer instructions that, when executed by the processor 36, cause and/or enable the handheld mobile device 16 to display a graphical user interface (GUI) that: (i) displays a virtual bubble level (or other graphic(s)) that provides a graphical display of readings taken by the tilt sensor 28 such that the graphical display indicates the attitude of the handheld mobile device 16 relative to true earth level or a programmed zero-point; (ii) displays a virtual bubble level (or other graphic(s)) that indicates the attitude of the PLA 12 relative to true earth level or a programmed zero-point; (iii) displays a virtual bubble level (or other graphic(s)) that indicates the attitude of the PLA 12 relative to the attitude of the handheld mobile device 16; (iv) allows a user to command and/or augment leveling operations; (v) allows a user to manually control leveling operations of the PLA 12 while displaying the virtual bubble level that provides visual feedback of the manual leveling operations in real-time; and/or (vi) allows a user to initiate and/or control manual and/or automatic leveling operations of the PLA 12 while displaying the virtual bubble level that provides visual feedback of the leveling operations in real-time.

The transmitter 24 may be any suitable hardware that is able to transmit electronic data to the PLA receiver 20 of the PLA 12 and may be a wireless transmitter that may be configured to transmit electromagnetic signals used for wireless communication, such as SRWCs and/or LRWCs (e.g., cellular communications). The transmitter 24 may include an antenna (not shown) and transmitter circuitry that may be used to transmit wireless signals. The transmitter 24 may be embodied as a transceiver that is used to transmit and receive wireless signals and the transmitter 24 may be part of a wireless communications module that may be configured to carry out SRWCs and/or LRWCs. The handheld mobile device 16 establishes a SRWC connection with the PLA 12. The SRWC connection can be established using any of a variety of SRWC technologies, including, for example, Wi-Fi™, Bluetooth™, other IEEE 802.11 protocols, ZigBee™, Z-Wave™, etc.

The input/output (I/O) device 26 may be a human-machine interface (HMI) that enables a user to provide input into the handheld mobile device 16 and receive output from the handheld mobile device 16. The I/O device 26 may be a device that may include both input and output functionality, such as a touchscreen display, and constitutes both an input device and an output device. However, it should be appreciated that separate devices may be used for providing input into the handheld mobile device 16 and receiving output from the handheld mobile device 16. For example, the input device could be a pushbutton that is pressable by a user, an electronic touchscreen display that detects a user's touch, or a microphone that receives audio data from a user. And, for example, the output device could be an electronic display, an audio speaker, a vibrator, or a light (e.g., LED).

The PO device 26 may be used to receive a zero-point set command from a user, which may be then used by the mobile device controller 22 (or other controller of the system) to generate a corresponding zero-point set command signal for the selected surface on which the handheld mobile device 16 is placed. The zero-point set command may be a command that indicates the current attitude or tilt of the device is to be used as a zero-point. That may be, for example, when a zero-point set command is received at the I/O device 26 from a user, the attitude of the handheld mobile device as indicated by one or more tilt angles is used as a reference for leveling the structure. For example, when the handheld mobile device 16 is placed on the selected surface s and then a user provides a zero-point set command, the tilt sensor 28 measures an attitude of the handheld mobile device 16 and this attitude may be later used to adjust the structure S so that the selected surface s is leveled.

The handheld mobile device 16 may include an output device that provides information to the user. The output device can be an audio speaker that outputs sounds to provide indications to the user, such as to indicate that an automatic leveling process is being performed. The output device may be used as a part of providing a visual or graphical user interface that enables a user to view information available at the handheld mobile device 16, such as the current attitude or tilt of the handheld mobile device 16 relative to true earth level (or a programmed/stored zero-point). For example, the mobile device controller 22 may be configured to cause an electronic display to display a virtual bubble level that may include a graphic indicating the present attitude relative to a zero-point, such as true earth level or a programmed/stored reference plane. In the illustrated embodiment, the input device and the output device are incorporated into a single device (i.e., the I/O device 26), which may be an electronic touchscreen display that enables a user to input information by touching the screen of the display and to view output that may be displayed on the screen. Although the handheld mobile device 16 is discussed as including a single input device and a single output device, in other embodiments, the handheld mobile device 16 can include a plurality of input devices and/or a plurality of output devices.

The tilt sensor 28 measures an attitude of the handheld mobile device 16 relative to gravity or true earth level, and can be any suitable type of tilt sensor, such as an accelerometer. The attitude may be obtained at the mobile device controller 22 then sent to the PLA 12 via the transmitter 24. The attitude of the handheld mobile device 16 may be determined or defined by one or more tilt angles and may include or be generated based on a plurality of tilt angles. For example, the plurality of tilt angles can include tilt angles received from one or more tilt sensors including the tilt sensor 28. The tilt sensor 28 may be a multi-axis tilt sensor that is used to measure multiple tilt angles, which may be used as a part of determining/obtaining the attitude of the handheld mobile device 16. In other embodiments, the tilt sensor 28 may be a single-axis tilt sensor. Although the system 10 is described as including a single tilt sensor, it should be appreciated that the system 10 may include one or more additional tilt sensors and the additional tilt sensor(s) may be used to obtain sensor information that is a part of or used to generate the attitude of the handheld mobile device 16.

The mobile device controller 22 can send a command to the tilt sensor 28 that instructs the tilt sensor 28 to measure the tilt angle (or attitude) and to send the tilt angle (or attitude) back to the mobile device controller 22. The tilt sensor 28 may automatically take measurements periodically or in response to receiving instructions to do so from another device of the handheld mobile device 16.

Figure 3:
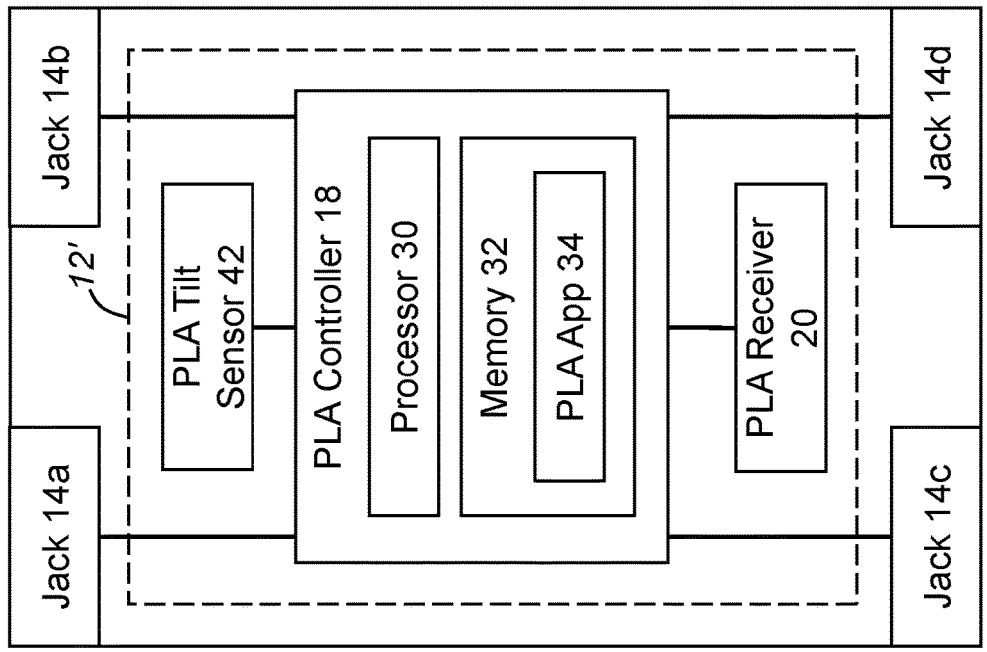
FIG. 3 is a block diagram showing a system for leveling a selected surface of a structure according to a second embodiment.
Figure 3:
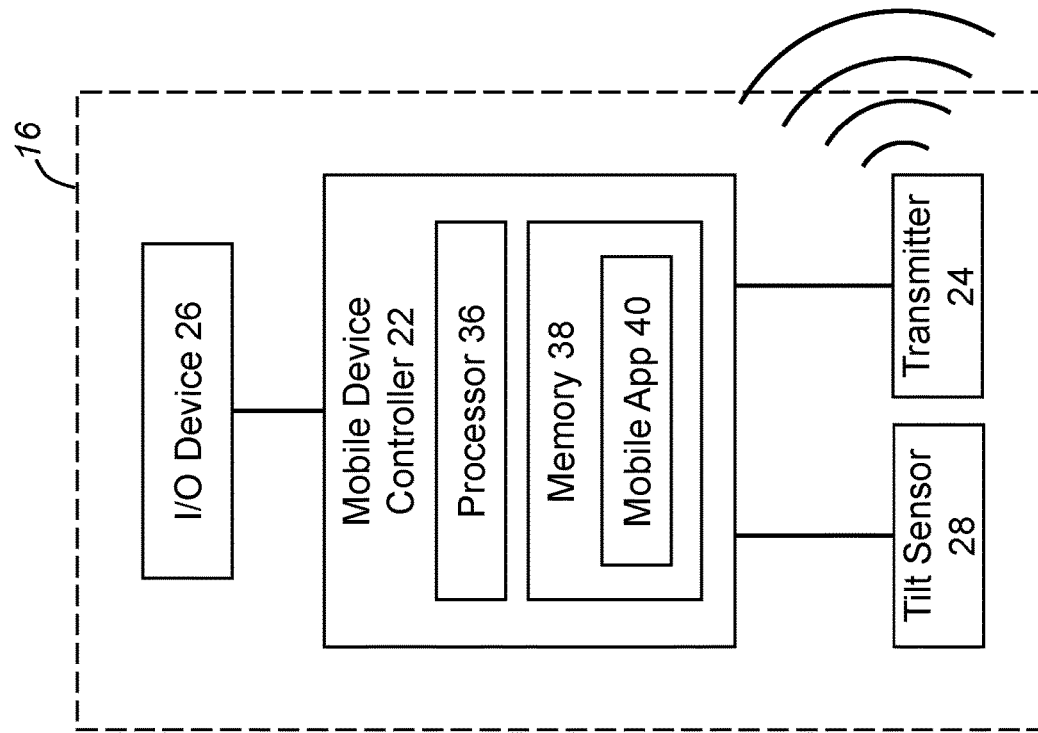

With reference now to FIG. 3, there is shown another embodiment of a system 10' having the handheld mobile device 16 and a PLA 12' that may include the same components of the embodiment shown in FIG. 2, but further may include a PLA tilt sensor 42. The PLA tilt sensor 42 may be integrated into the PLA 12', is supported on the structure S, and is used to obtain an attitude of the structure S. The discussion of the tilt sensor 28 of the handheld mobile device 16 applies to the PLA tilt sensor 42, except that that PLA tilt sensor 42 may be a part of the PLA 12' and not the handheld mobile device 16. Thus, the system 10' may include a tilt sensor integrated into both the handheld mobile device 16 and the PLA 12'.

Figure 4:
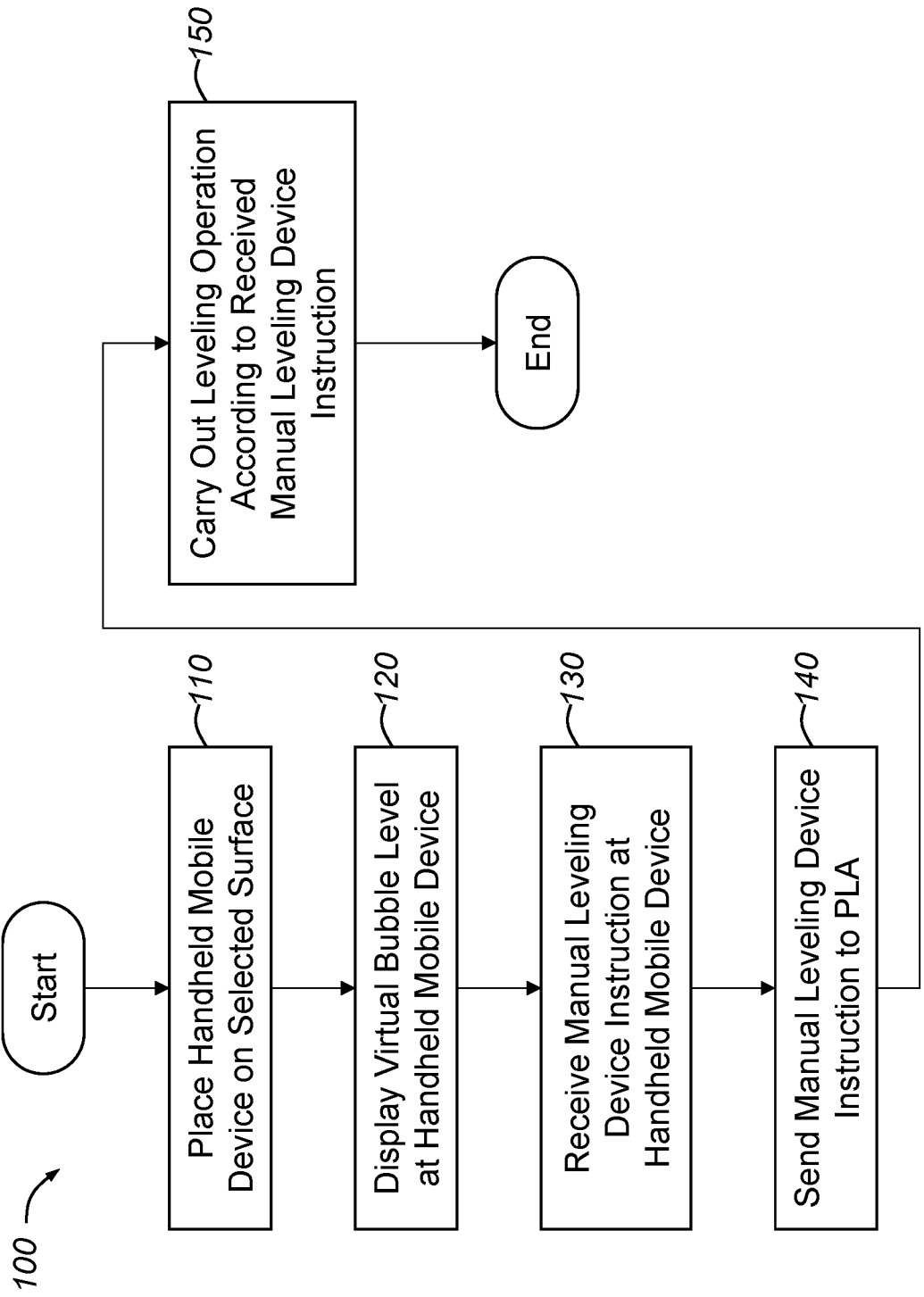
FIG. 4 is a flowchart illustrating a method of leveling a selected surface of a structure according to a first implementation.

With reference to FIG. 4, there is shown an embodiment of a method 100 for leveling a selected surface of a structure and, in particular, for manually controlling a leveling device of a platform leveling apparatus using a handheld mobile device. The method 100 is described below with reference to the system 10 above; however, it should be appreciated that the method 100 can be used with various other systems. Although the steps of the method 100 are described as being carried out in a particular order, it is hereby contemplated that the steps of the method 100 may be carried out in any technically feasible order, such as by having step 120 being carried out before step 110.

Figure 5:
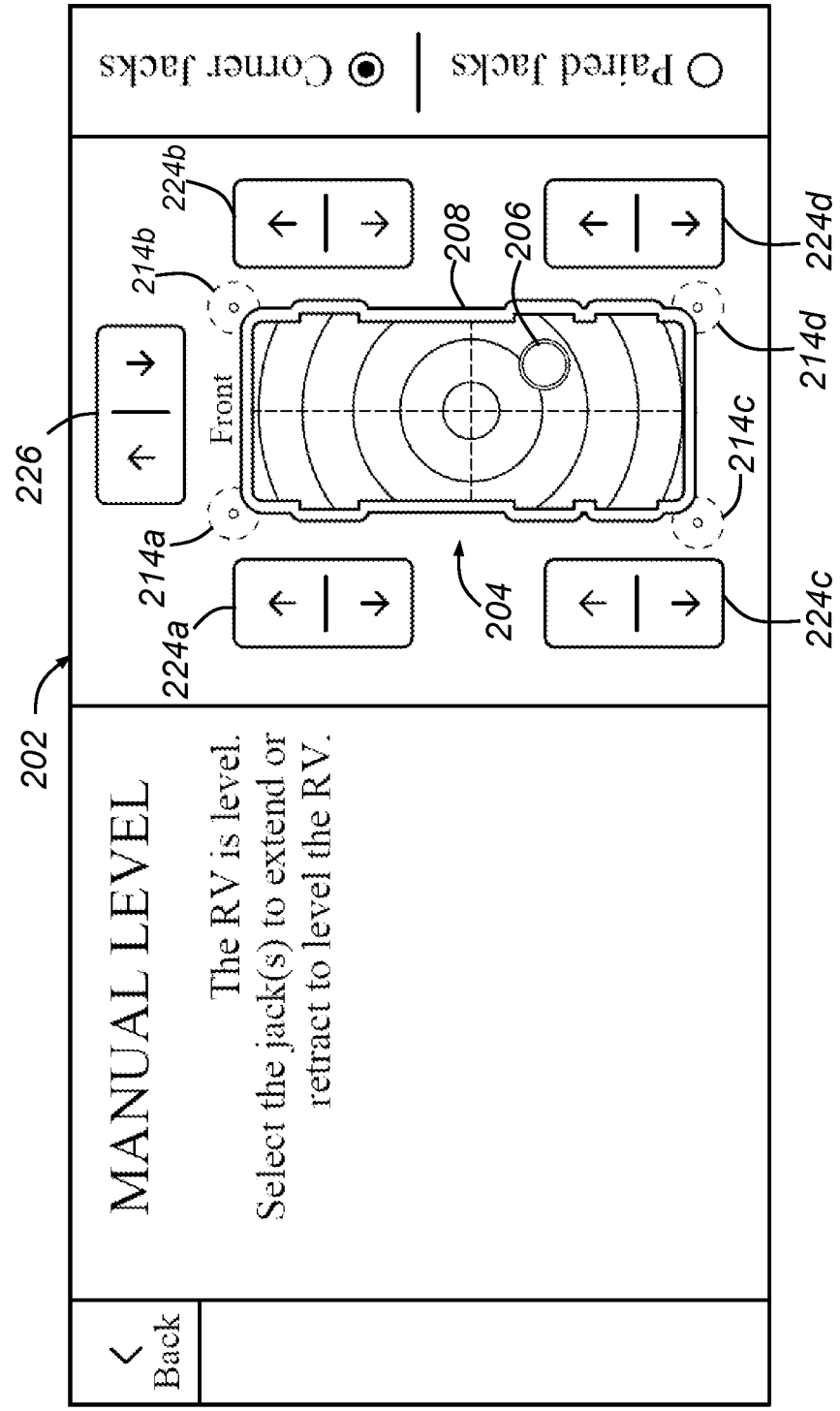
FIG. 5 is a block diagram showing a manual leveling device command screen of a graphical user interface that may be provided by the handheld mobile device.

The method 100 will be described with reference to FIG. 5, which depicts a graphical user interface (GUI) 200 that may be used as a part of the method 100. The GUI 200 may be provided by the mobile application 40, and may be presented on an electronic touchscreen of the handheld mobile device 16, which may be a part of the I/O device 26. FIG. 5 shows a manual leveling device command screen 202 that may be used by a user to manually control one or more jacks (or other leveling devices) 14*a-d*. The manual leveling device command screen 202 may include a virtual bubble level 204 that may be used to indicate an attitude of the handheld mobile device 16 relative to true earth level. In particular, the virtual bubble level 204 may include a virtual bubble graphic 206 in the form of a circle that indicates the present attitude of the handheld mobile device 16 relative to true earth level. The virtual bubble level 204 may include a background graphic 208 outlining the shape of the vehicle (or other structure) on which the PLA 12 is installed and providing context to the virtual bubble level graphic 206 in that the center-most concentric circle of the background graphic 208 indicates true earth level or a stored zero-point. This vehicle-shaped background graphic 208 may be used to orient the user with respect to the vehicle. However, in other embodiments, the background graphic 208 may be shaped differently, such as circularly-shaped.

The GUI 200 also indicates a position at which the four jacks 14*a-d* are located by depicting a leveling device graphic 214*a-d* for each of the jacks 14*a-d*. For example, the left-front jack 14*a* of the PLA 12 is indicated by a first leveling device graphic 214a. The leveling device graphics 214a-d each indicate a status of the corresponding leveling device 14a-d, such as whether the leveling device is unable to be extended or retracted, whether the leveling device is currently being extended or retracted, etc. These indications may be provided, for example, by dynamically rendering the leveling device graphic 214a-d with a particular color. Additionally or alternatively, other visual effects can be used to provide such indications. The GUI 200 further may include a set of manual command graphics 224a-d that may be used by the user for providing manual leveling device instructions to the handheld mobile device 16. In the illustrated embodiment, the GUI 200 may include a manual command graphic 224a-d for each of the jacks 14a-d. Each of the manual command graphics 224a-d may include an up arrow and a down arrow that allows the user to command the corresponding leveling device 14a-d to extend (up arrow) or retract (down arrow).

The GUI 200 also may include a multi-leveling device manual command graphic 226 that allows the user to provide a manual leveling device instruction that causes a plurality of jacks (or leveling devices) 14a-d to be operated together. In the illustrated embodiment, the multi-leveling device manual command graphic 226 may include an up arrow and a down arrow that enables the user to control a pair of leveling devices together. For example, when the user presses the up arrow of the multi-leveling device manual command graphic 226, the left-front jack 14a and the right-front jack 14b (i.e., the front-pair of leveling devices) may be extended so as to raise the front end of the vehicle (or structure).

The method 100 begins with step 110, wherein a user places a handheld mobile device on a selected surface that is to be leveled. For example, as shown in FIG. 1, the handheld mobile device 16 is placed on the selected surface s by the user. The method 100 continues to step 120.

In step 120, the handheld mobile device displays a virtual bubble level. As discussed above, the handheld mobile device 16 may include the mobile application 40, which may be used to display a virtual bubble level, such as the virtual bubble level 204 that is a part of the manual leveling device command screen 202 of the GUI 200. The method 100 continues to step 130.

In step 130, a manual leveling device instruction may be received from a user via an input device of the handheld mobile device. A manual leveling device instruction is an instruction to actuate or otherwise operate a leveling device in a particular manner as specified by a user. For example, the manual leveling device instruction may be an instruction to retract the left-front jack 14a, or may be an instruction to raise the right side of the structure S, which can include, for example, extending the right-front jack 14b and the right-rear jack 14d. The GUI 200 may be used to receive the manual leveling device instruction from the user via the touchscreen display of the handheld mobile device 16 on which the GUI 200 is displayed. For example, the user may press the down arrow of the first manual command graphic 224a, which causes a manual leveling device instruction to be generated for retracting the left-front jack 14a. The method 100 continues to step 140.

In step 140, the manual leveling device instruction is sent from the handheld mobile device to a PLA. The handheld mobile device 16 sends the manual leveling device instruction as a manual leveling device instruction signal using the transmitter 24 and the manual leveling device instruction is then received at the PLA receiver 20 of the PLA 12. The manual leveling device instruction signal is sent over a SRWC connection between the handheld mobile device 16 and the PLA 12, such as over a Wi-Fi™ or Bluetooth™ connection. The manual leveling device instruction signal is sent from the handheld mobile device 16 to the PLA 12 using cellular communications or other LRWCs. The method 100 continues to step 150.

In step 150, the PLA carries out a leveling operation according to the received manual leveling device instruction. The PLA 12 receives the manual leveling device instruction signal, which indicates the manual leveling device instruction, from the handheld wireless device 16 (as a result of step 140) and then causes the leveling operation to be carried out according to the manual leveling device instruction. For example, The manual leveling device instruction specifies extending the right-front jack 14b and, thus, the PLA 12, through use of the processor 30 (for example), determines one or more leveling device commands to send to the right-front jack 14b so as to extend the right-front jack 14b. The method 100 then ends.

Figure 6:
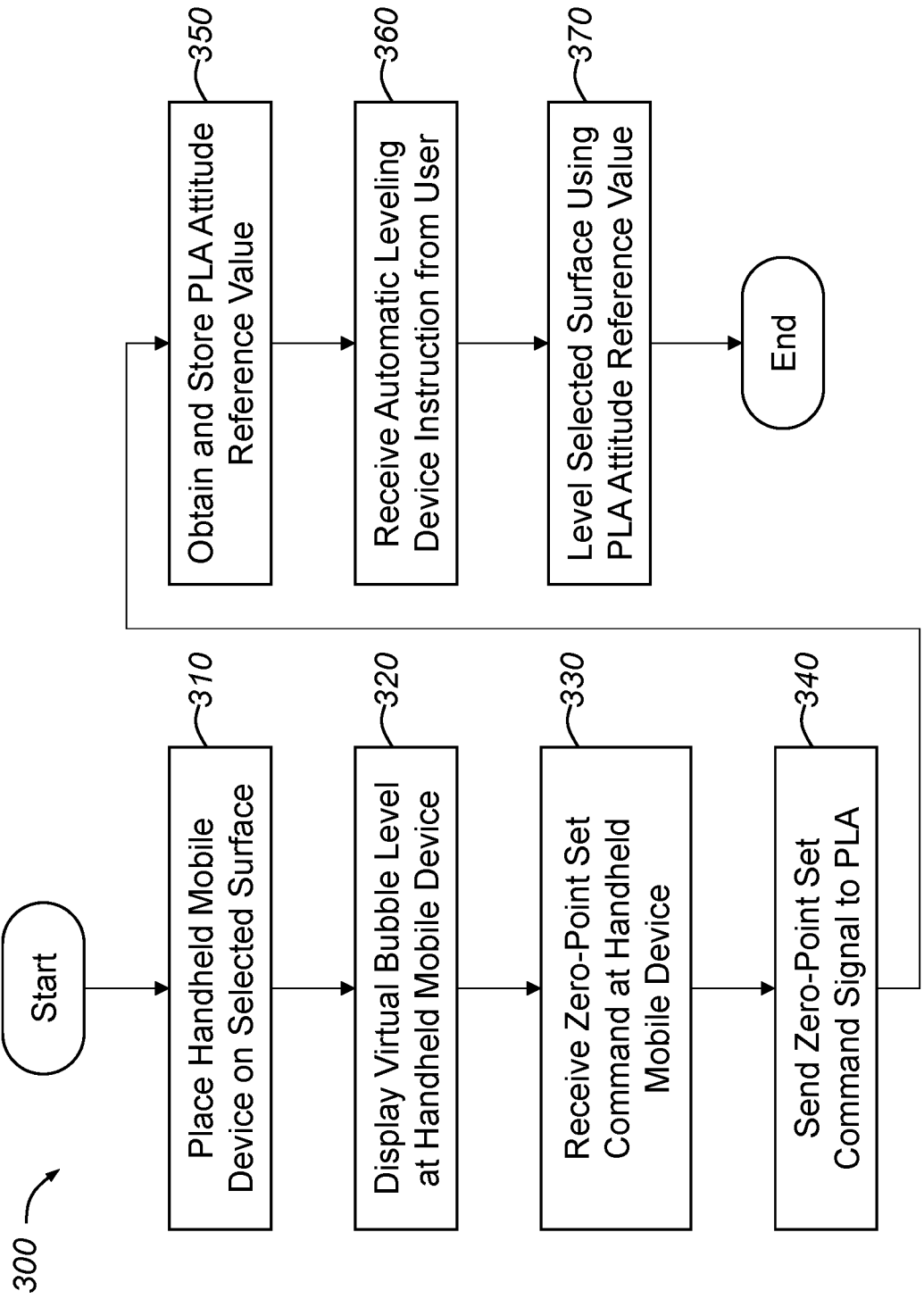
FIG. 6 is a flowchart illustrating a method of leveling a selected surface of a structure according to a second implementation.

With reference to FIG. 6, there is shown an embodiment of a method 300 of leveling a selected surface of a structure. The method 300 is described below with reference to the system 10' above; however, it should be appreciated that the method 300 can be used with various other systems. Although the steps of the method 300 are described as being carried out in a particular order, it is hereby contemplated that the steps of the method 300 may be carried out in any technically feasible order.

The method 300 begins with step 310, wherein a user places a handheld mobile device on a selected surface that is to be leveled. For example, as shown in FIG. 1, the handheld mobile device 16 may be placed on the selected surface s by the user. The method 300 continues to step 320.

In step 320, the handheld mobile device displays a virtual bubble level. As discussed above, the handheld mobile device 16 may include the mobile application 40 that, at least in some embodiments, can be used to display a virtual bubble level, such as the virtual bubble level 204 (FIG. 5), 604 (FIG. 9), 604' (FIG. 10), or 604" (FIG. 11). The method 300 continues to step 330.

In step 330, a zero-point set command is received from a user via an input device of the handheld mobile device and the handheld mobile device then generates a zero-point set command signal. For example, once the user places the handheld mobile device 16 on the selected surface s, the user can then select a "SET ZERO-POINT" graphic from a GUI, such as the GUI 200, indicating to use the present attitude as measured by the tilt sensor 28 (and/or other tilt sensor(s) of the handheld mobile device 16) as the zero-point, which, as discussed below, is used to adjust the structure S so that the selected surface s is leveled. The handheld mobile device 16 generates the zero-point set command signal in response to receiving the zero-point set command from the user. The method 300 continues to step 340.

In step 340, the zero-point set command signal is sent from the handheld mobile device to the PLA. The zero-point set command signal is sent from the transmitter 24 of the handheld mobile device 16 and received at the PLA receiver 20 of the PLA 12 via SRWCs or LRWCs. The method 300 continues to step 350.

In step 350, in response to receiving the zero-point set command signal, the PLA obtains a PLA attitude reference value that indicates the attitude or tilt of the structure S relative to the attitude or tilt as measured at the handheld mobile device. The PLA attitude reference value may be based on the attitude (or one or more tilt angles) measured using tilt sensor(s) at the PLA, such as the PLA tilt sensor 42, at the time the zero-point set command signal is received. In response to and at the time of receiving the zero-point set command signal, the PLA tilt sensor 42 may measure one or more tilt angles (used to represent an attitude) and the measured tilt angles (or attitude) may be used to generate or otherwise obtain the PLA attitude reference value. The method 300 continues to step 360.

In step 360, an automatic leveling device instruction is received from a user via an input device of the handheld mobile device and the handheld mobile device then generates an automatic leveling device instruction signal. For example, once the user places the handheld mobile device 16 on the selected surfaces, the user can then select a "LEVEL SURFACE" graphic from a GUI, which indicates that an automatic leveling process is to be carried out so as to level the selected surface s on which the handheld mobile device was placed. The handheld mobile device 16 generates an automatic leveling device instruction signal in response to receiving the automatic leveling device instruction from the user. The method 300 continues to step 370.

In step 370, the PLA levels the structure so that the selected surface is leveled by commanding movement of the structure so that (or until) the attitude or tilt of the structure as measured by the tilt sensor of the PLA equals (or otherwise corresponds to) the PLA attitude reference value. As discussed above, the PLA attitude reference value may be based on the attitude or tilt as measured at the PLA at the time the zero-point set command signal is received. For example, the PLA attitude reference value may be the attitude or tilt as measured at the PLA after the user manually leveled the selected surface s, such as through the method 100. Thus, in such an example, causing the leveling device(s) to operate until the attitude or tilt as measured at the PLA tilt sensor 42 of the PLA '12 equals the PLA attitude reference value results in leveling the selected surface s on which the handheld mobile device 16 was placed (step 310). The method 300 then ends.

The method 100 and 300 may be used together by a user to manually adjust the attitude of the structure S by using the GUI 200 (method 100) and then, once the selected surface s is suitably level (i.e., the user is satisfied with the attitude), the user can use the GUI 200 to set a zero-point of the structure S (method 300). At a later time, such as after the user has moved the vehicle or otherwise repositioned/reoriented the structure S, the user provides an automatic leveling device instruction (step 360) and then the PLA 12' actuates the jacks 14a-d so that the stored reference value (see step 350) equals (or corresponds to) the measured attitude being received by the PLA tilt sensor 42 of the PLA 12' thereby leveling the selected surface s.

Figure 7:
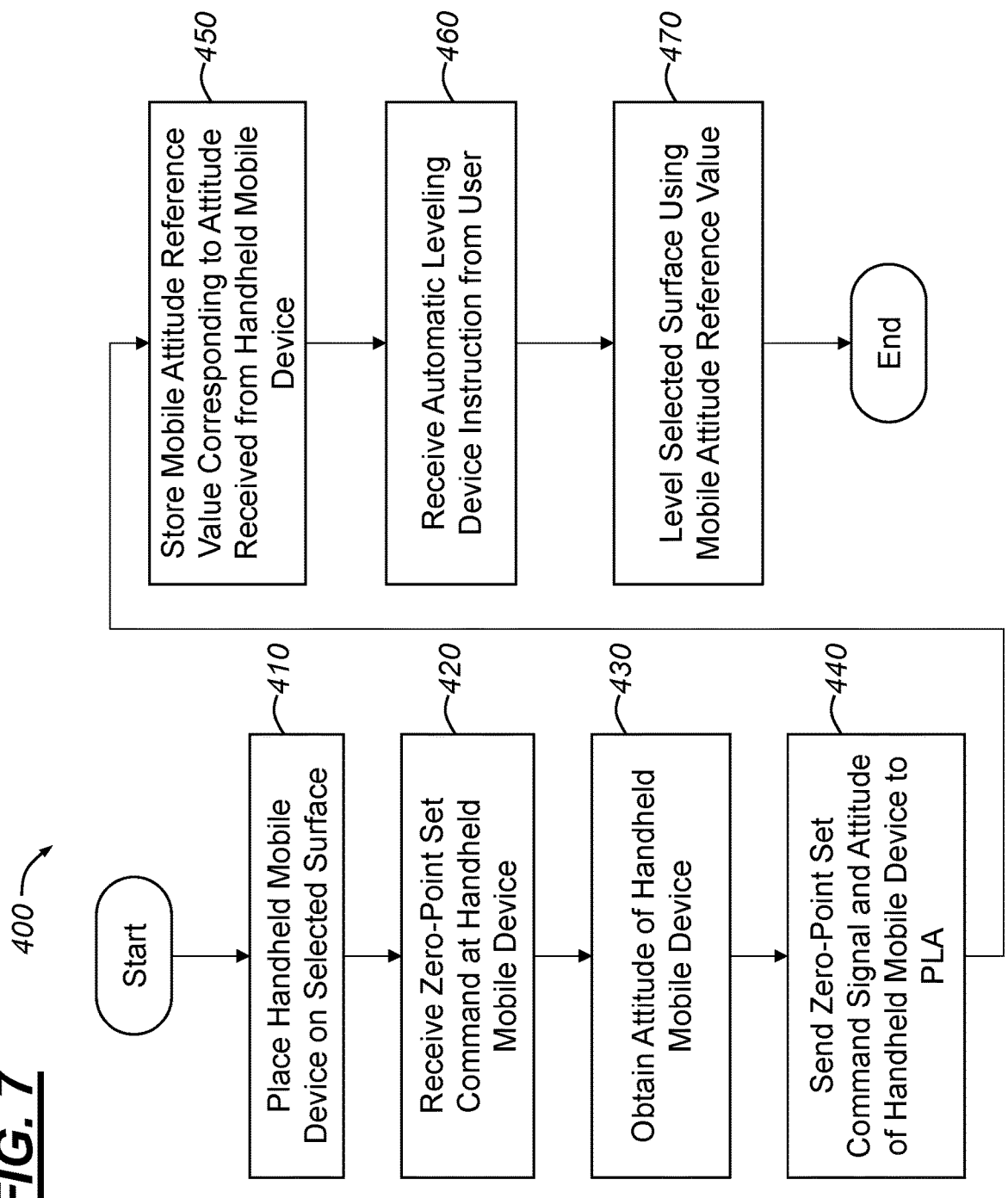
FIG. 7 is a flowchart illustrating a method of leveling a selected surface of a structure according to a third implementation.

With reference to FIG. 7, there is shown an embodiment of a method 400 of leveling a selected surface of a structure. The method 400 is described below with reference to the system 10' above; however, it should be appreciated that the method 400 can be used with various other systems. Although the steps of the method 400 are described as being carried out in a particular order, it is hereby contemplated that the steps of the method 400 may be carried out in any technically feasible order.

The method 400 begins with step 410, wherein a user places a handheld mobile device on a selected surface that is to be leveled. For example, as shown in FIG. 1, the handheld mobile device 16 may be placed on the selected surface s by the user. The method 400 continues to step 420.

In step 420, a zero-point set command is received from a user via an input device of the handheld mobile device and the handheld mobile device then generates a zero-point set command signal. This step is the same as step 330 of the method 300 (FIG. 6) and that discussion is incorporated herein. The method 400 then continues to step 430.

In step 430, an attitude of the handheld mobile device is obtained using a tilt sensor of the handheld mobile device. The attitude of the handheld mobile device 16 may be obtained based on one or more tilt angles that are measured by the tilt sensor 28 in response to receiving the zero-point set command. Additionally, or alternatively, the attitude of the handheld mobile device 16 may be obtained based on one or more title angles that were most-recently measured by the tilt sensor 28. The one or more tilt angles and/or the attitude may be stored at memory 38 of the handheld mobile device 16. The method 400 continues to step 440.

In step 440, the zero-point set command signal and the attitude of the handheld mobile device are sent from the handheld mobile device to the PLA. The zero-point set command signal and the attitude of the handheld mobile device are sent from the transmitter 24 of the handheld mobile device 16 and received at the PLA receiver 20 of the PLA 12 via SRWCs or LRWCs. The zero-point set command signal and the attitude of the handheld mobile device are sent together in a single message; however, in other embodiments, the zero-point set command signal and the attitude of the handheld mobile device are sent in different messages. The method 400 continues to step 450.

In step 450, a mobile attitude reference value corresponding to the attitude received from the handheld mobile device is stored. The mobile attitude reference value may include one or more tilt angles used as a part of obtaining the attitude received from the handheld mobile device 16. The mobile attitude reference value may be stored in memory 32 of the PLA controller 18 or other suitable memory. The method 400 continues to step 460.

In step 460, an automatic leveling device instruction is received from a user via an input device of the handheld mobile device and the handheld mobile device then generates an automatic leveling device instruction signal. For example, the user can then select a "LEVEL SURFACE" graphic from a GUI, which indicates that an automatic leveling process is to be carried out so as to level the selected surface s according to the zero-point that is represented by the stored mobile attitude reference value. The handheld mobile device 16 generates the automatic leveling device instruction signal in response to receiving the automatic leveling device instruction from the user and, then, the handheld mobile device 16 sends the automatic leveling device instruction signal to the PLA 12'. The method 400 continues to step 470.

In step 470, the PLA levels the structure so that the selected surface is leveled by commanding movement of the structure so that (or until) the attitude or tilt of the structure as measured by the tilt sensor of the PLA equals the mobile attitude reference value. As discussed above, the mobile attitude reference value may be based on the attitude or tilt as measured at the handheld mobile device. The mobile attitude reference value may, for example, be the attitude or tilt as measured at the handheld mobile device 16 and so moving of the leveling device(s) until the attitude or tilt as measured at the PLA tilt sensor 42 of the PLA '12 equals the mobile attitude reference value results in leveling the selected surface s on which the handheld mobile device 16 was placed (step 310) when the zero-point set command was received from the user. The method 400 then ends.

The method 400 may be used to store a mobile attitude reference value in response to receiving a zero-point set command from the user (steps 410-450). Then, at a later time, such as after the vehicle has been moved or the structure S has otherwise been repositioned/reoriented, the user can provide an automatic leveling device instruction that then causes the PLA 12' to actuate the jacks 14*a-d* until the attitude of the PLA 12' (as presently obtained based on tilt angle(s) being measured from the PLA tilt sensor 42 (and/or other tilt sensor(s))) equals the mobile attitude reference value. Thus, the method 400 can be used to set a zero-point for the selected surface s and to automatically level the selected surface s.

The method 400 may be used to store an attitude reference value that may be based on both an attitude (or one or more tilt angles) as measured by the tilt sensor 28 and an attitude (or one or more tilt angles) as measured by the PLA tilt sensor 42. For example, the attitude reference value may be based on a difference between a tilt angle of the attitude of the selected surface as obtained by the tilt sensor 26 of the handheld mobile device 16 and a tilt angle of the attitude of the structure as obtained by the PLA tilt sensor 42. The attitude of the selected surface as obtained by the tilt sensor 26 of the handheld mobile device 16 may not be level when the attitude reference value is received. However, since the attitude reference value is based on both the attitude of the selected surface and the attitude of the PLA 12', causing the jacks 14*a-d* to move so that the attitude as measured by the PLA tilt sensor 42 equals (or corresponds to) the stored attitude reference value results in the selected surface s being leveled.

Figure 8:
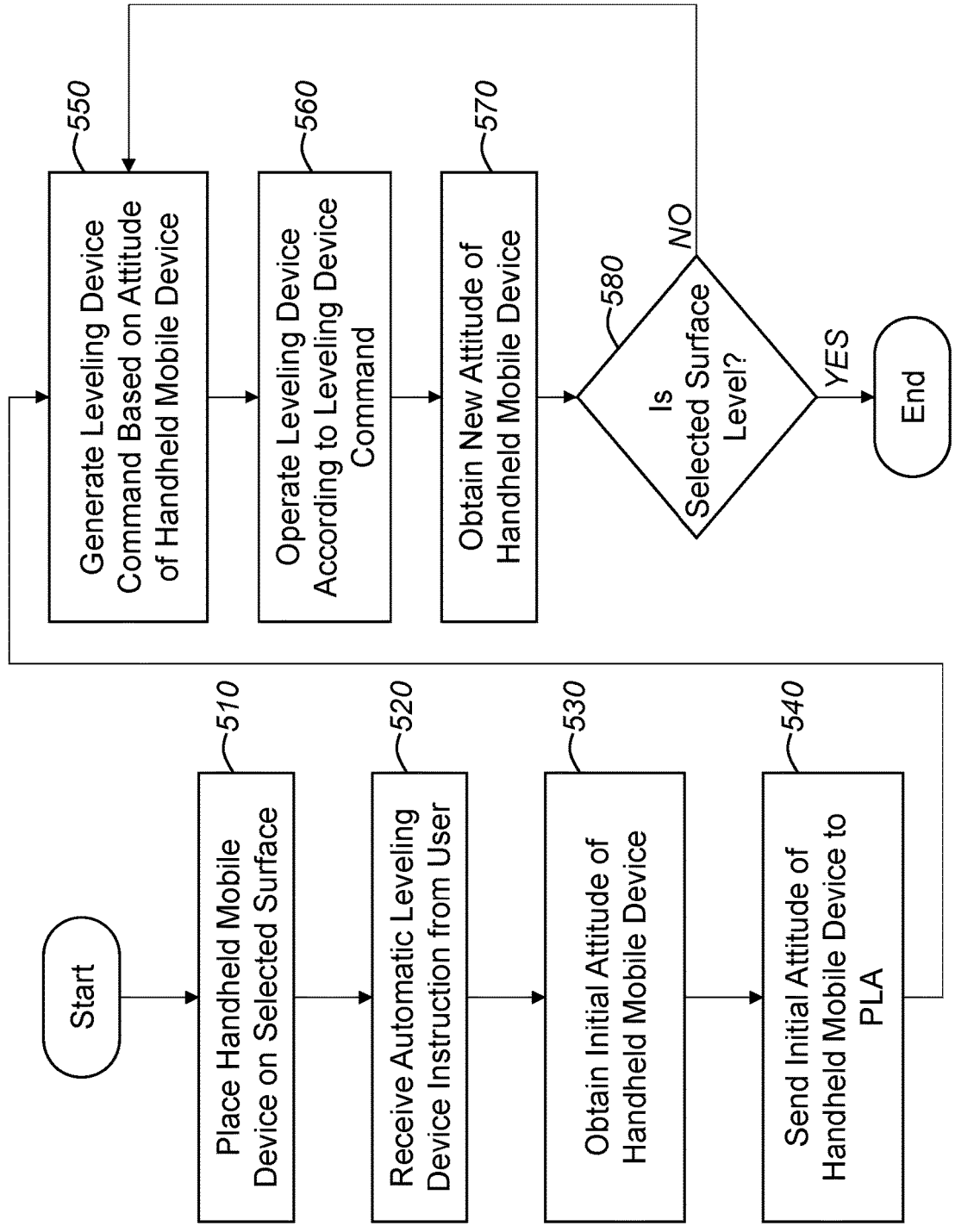
FIG. 8 is a flowchart illustrating a method of leveling a selected surface of a structure according to a fourth implementation.

With reference to FIG. 8, there is shown an embodiment of a method 500 of leveling a selected surface of a structure. The method 500 is described below with reference to the system 10 above; however, it should be appreciated that the method 500 can be used with various other systems. Although the steps of the method 500 are described as being carried out in a particular order, it is hereby contemplated that the steps of the method 500 may be carried out in any technically feasible order.

The method 500 begins with step 510, wherein a user places a handheld mobile device on a selected surface that is to be leveled. For example, as shown in FIG. 1, the handheld mobile device 16 may be placed on the selected surface s by the user. The method 500 continues to step 520.

In step 520, an automatic leveling device instruction is received from a user via an input device of the handheld mobile device and the handheld mobile device then generates an automatic leveling device instruction signal. For example, once the user places the handheld mobile device 16 on the selected surfaces, the user can then select a "LEVEL SURFACE" graphic from a GUI, which indicates that an automatic leveling process is to be carried out so as to level the selected surface s on which the handheld mobile device was placed. The handheld mobile device 16 generates the automatic leveling device instruction signal in response to receiving the automatic leveling device instruction from the user. The method 500 continues to step 530.

In step 530, an initial attitude of the handheld mobile device is obtained using a tilt sensor of the handheld mobile device. The initial attitude of the handheld mobile device 16 is obtained based on one or more tilt angles that are measured by the tilt sensor 28 in response to receiving the automatic leveling device instruction. The one or more tilt angles may be stored at memory 38 of the handheld mobile device 16. The method 500 continues to step 540.

In step 540, the initial attitude of the handheld mobile device is sent from the handheld mobile device to the PLA. The initial attitude of the handheld mobile device is sent from the transmitter 24 of the handheld mobile device 16 and received at the PLA receiver 20 of the PLA 12 via SRWCs or LRWCs. The method 500 continues to step 550.

In step 550, a leveling device command is generated based on the attitude of the handheld mobile device. The leveling device command is a command or instruction that is sent to a leveling device and that causes the leveling device to move in a specified manner. The leveling device command specifies a particular amount and direction of movement. As a part of a first iteration, this step uses the initial attitude of the handheld mobile device that is received in step 540. In other iterations, this step uses an updated attitude of the handheld mobile device as measured in step 570 after operating the leveling device(s) in step 560. According to at least one embodiment, in either the first iteration or the other iterations, the most-recent attitude of the handheld mobile device may be used for generating the leveling device command. This step of generating the leveling device command may include identifying a leveling device and determining desired movement of the identified leveling device. This step may be carried out by the PLA controller 18 of the PLA 12. The method 500 continues to step 560.

In step 560, a leveling device is operated according to the leveling device command. This step may include sending the leveling device command to the leveling device, which then causes the leveling device to operate according to the leveling device command. This step may include sending the leveling device command to the leveling device, receiving feedback from the leveling device (or another device of the PLA 12), and then generating another leveling device command that is then sent to the leveling device. For example, the leveling device command specifies a direction of movement that, when received at the leveling device, causes the leveling device to move in the specified direction of movement. Then, the leveling device sends, to the PLA controller 18, an extension value indicating how far the leveling device is extended and, based on this extension value, the PLA controller 18 determines to continue moving the leveling device in the specified direction of movement or determines an updated leveling device command that is then sent to the leveling device (or another leveling device). The method 500 continues to step 570.

In step 570, a new attitude of the handheld mobile device is obtained. The new attitude of the handheld mobile device refers to an attitude that is taken after a leveling operation has already been carried out as a part of leveling the selected surface. The new attitude of the handheld mobile device 16 may be obtained from the tilt sensor 28 of the handheld mobile device 16 and then sent to the PLA 12 from the transmitter 24 to the PLA receiver 20 of the PLA 12. The method 500 continues to step 580.

In step 580, it is determined whether the selected surface is level. This step may be carried out at the PLA 12, such as by the PLA controller 18. For example, the new attitude may be obtained at the handheld mobile device 16 and then sent to the PLA 12, which can then determine whether the new attitude is level with respect to true earth level. This step may be carried out at the handheld mobile device 16 and then, if it is determined that the selected surface is level, the handheld mobile device 16 may inform the PLA 12 that the selected surface is level. In such embodiments, for example, if it is determined that the selected surface is not level, then the handheld mobile device 16 sends the new attitude as obtained in step 570 to the PLA 12, such as by sending the new attitude from the transmitter 24 to the PLA receiver 20 of the PLA 12. The selected surface is determined to be level when the new attitude indicates that the handheld mobile device 16 is level with respect to true earth level. This can be when a tilt angle of the new attitude relative to true earth level is 0° or when the tilt angle of the new attitude is within a predetermined tolerance amount, such as less than 1° relative to true earth level. When it is determined that the selected surface is not level, the method 500 proceeds back to step 550 wherein a new leveling device command is generated based on the new attitude. Steps 550-580 are thus carried out until it is determined that the selected surface is level. When it is determined that the selected surface is level, the method 500 ends.

Thus, according to at least one embodiment, the method 500 may be used to automatically level the selected surface s through an iterative process based on the attitude of the handheld mobile device 16. The PLA 12 may note how certain leveling operations (e.g., extending the right-front jack 14*b*) affect the attitude of the handheld mobile device 16 by keeping track of the leveling operations and tracking the change in attitude of the handheld mobile device 16 from iteration to iteration. This information may then be used as a part of determining desired operation of the jack(s) so that leveling command(s) may be generated accordingly and sent to the jack(s), which may be a part of step 550.

Figure 9:
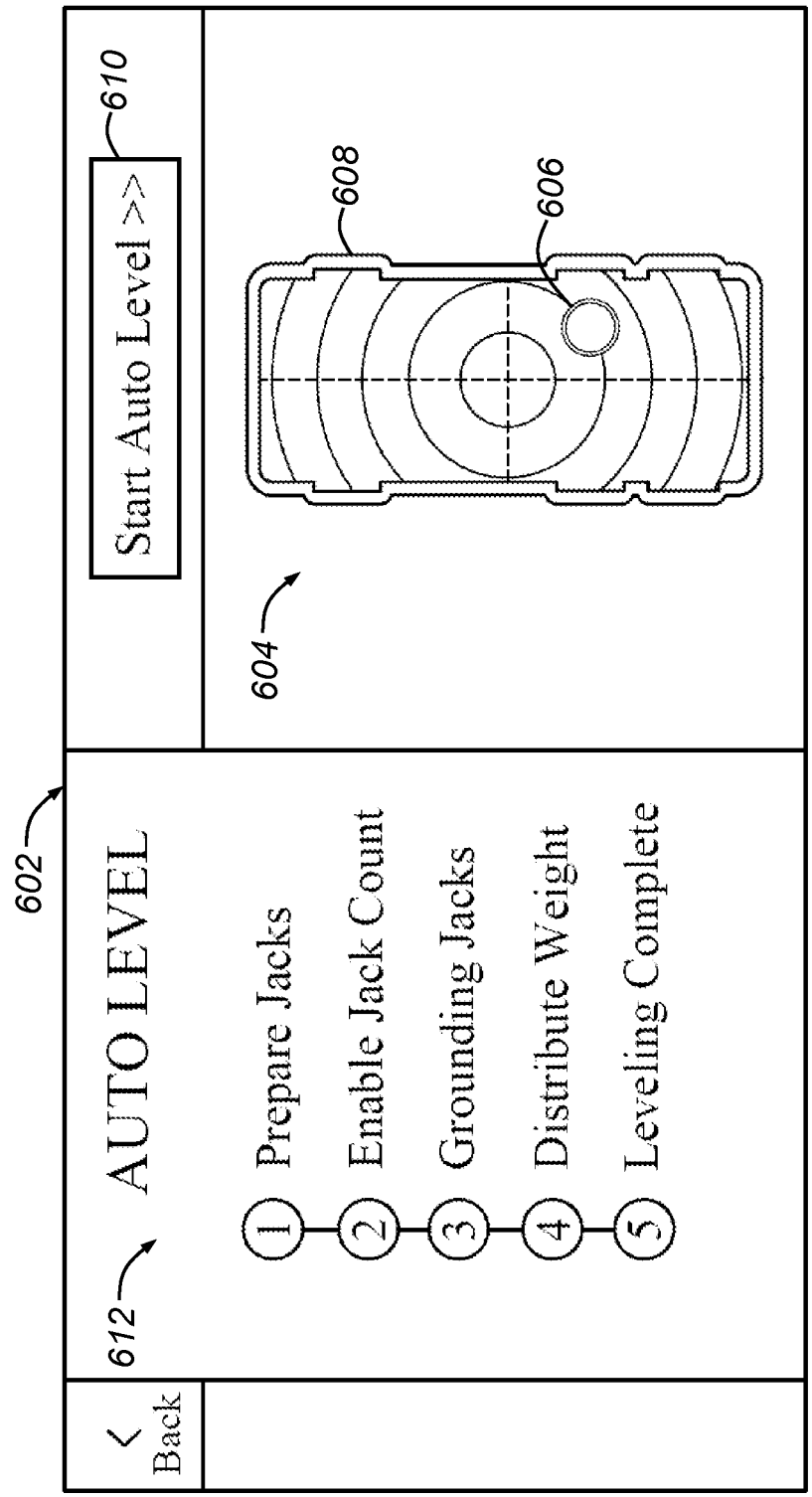
FIG. 9 is a block diagram showing an embodiment of an automatic leveling screen of a graphical user interface that may be provided by the handheld mobile device.

With reference to FIGS. 9-11, there are shown automatic leveling screens 602, 602', 602" that may be used as a part of the GUI 200 or other GUI of the handheld mobile device 16. The automatic leveling screens 602, 602', 602" each include a virtual bubble level 604, 604', 604" that each include a virtual bubble graphic 606 and differing background graphics 608, 608', 608". The virtual bubble level 604 of the automatic leveling screen 602 may include a vehicle-shaped background graphic 608 that is in the shape of the vehicle. In other embodiments, such as those where the PLA 12' may be used on a structure that is not a part of a vehicle, the background graphic 608 may be shaped accordingly so as to provide the user an indication of the orientation of the vehicle.

As shown in FIG. 10, the virtual bubble level 604' of the automatic leveling screens 602' may include a circular-shaped background graphic 608' that may include an upward facing arrow that indicates a particular direction of the structure S, such as the front of the vehicle. As shown in FIG. 11, the virtual bubble level 604" of the automatic leveling screens 602" may include background graphics 608" that may include a circular background 612 and a vehicle-shaped background graphic 614 that is shaped as a trailer, which may be the structure having a surface to be leveled. Of course, other types of background graphics or other graphics may be used as a part of the virtual bubble level 604, 604', 604" according to various embodiments.

The orientation of the handheld mobile device 16 may be determined relative to the orientation of the structure S (or the PLA 12, 12'). For example, in certain scenarios, it may be desirable to determine the relative orientation of the handheld mobile device 16 relative to the PLA 12 when taken in a plane that is perpendicular to the direction of earth's gravity g. Thus, for example, this relative orientation may be used to transform an attitude measured by the tilt sensor 26 at a first orientation (e.g., the orientation of the handheld mobile device 16) to an attitude corresponding to a second orientation, which may be the orientation of the PLA 12', so that the attitude is understandable and usable at the PLA 12' in conjunction with readings of the PLA 12' as taken by the PLA tilt sensor 42 at the second orientation. In one embodiment, a compass of the handheld mobile device 16 may be used to determine the first orientation and a compass of the PLA 12' may be used to determine the second orientation.

Any one or more of the processors discussed herein (e.g., processor 30 of the PLA controller 18, processor 36 of the mobile device controller 22) may include, for example, one or more microprocessors, microcontrollers, discrete logic circuits having logic gates for implementing logic functions on data signals, application specific integrated circuits with suitable logic gates, programmable or complex programmable logic devices, programmable or field programmable gate arrays, and/or any other suitable type of electronic processing device(s).

Any one or more of the memory discussed herein (e.g., memory 32 of the PLA controller 18, memory 38 of the mobile device controller 22) may be in the form of removable and/or non-removable, volatile memory and/or non-volatile memory. Illustrative volatile memory may include, for example, random access memory (RAM), static RAM (SRAM), dynamic RAM (DRAM) including synchronous or asynchronous DRAM, and/or the like, for running software and data on the processor. By way of example, and not limitation, the volatile memory may include an operating system, application programs, other memory modules, and data. Illustrative non-volatile memory may include, for example, read only memory (ROM), erasable programmable ROM (EPROM), electrically erasable programmable ROM (EEPROM), dynamic read/write memory like magnetic or optical disks or tapes, and static read/write memory like flash memory, for storing software and data. Although not separately shown, the computer may also include other removable/non-removable volatile/non-volatile data storage or media. For example, the other media may include dynamic or static external storage read/write device(s).

The methods or parts thereof can be implemented in a computer program product including instructions carried on a computer readable storage medium for use by one or more processors of one or more computers to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program product can be executed on one computer or on multiple computers in communication with one another.

The program(s) can be embodied on non-transitory computer readable media, which can include one or more storage devices, articles of manufacture, or the like. Example non-transitory computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The non-transitory computer readable storage medium may also include computer to computer connections, for example, via a network or another communications connection (either wired, wireless, or a combination thereof). Non-transitory computer readable media include all computer readable media, with the sole exception of transitory propagating signals. Any combination(s) of the above examples is also included within the scope of the computer-readable media. It is therefore to be understood that the method(s) can be at least partially performed by any electronic articles and/or devices capable of executing instructions corresponding to one or more steps of the disclosed method(s).

This description, rather than describing limitations of an invention, only illustrates embodiments of the invention recited in the claims. The language of this description is therefore exclusively descriptive and non-limiting.

Obviously, it's possible to modify this invention from what the description teaches. Within the scope of the claims, one may practice the invention other than as described above.

What is claimed is:

1. A system for leveling a selected surface of a structure, the system comprising:
   a platform leveling assembly (PLA) configured to be supported on the structure to be leveled, the PLA including:
   a PLA controller configured to be communicatively coupled with one or more leveling devices and configured to send, to the leveling device(s), leveling device commands that, when received by the leveling device(s), cause the leveling device(s) to change the attitude of the structure; and
   a PLA receiver communicatively coupled with the PLA controller and configured to receive wireless signals carrying a leveling device instruction and to send the leveling device instruction to the PLA controller; and
   wherein the leveling device instruction includes an automatic leveling device instruction that instructs the PLA to level the structure according to a stored zero-point reference value, wherein the stored zero-point reference value is set after having leveled the selected surface using an automatic leveling process; and
   a handheld mobile device including:
      a tilt sensor configured to sense an attitude of the selected surface on which the handheld mobile device is placed;
      a transmitter configured to send wireless signals to the PLA receiver;
      a mobile device controller communicatively coupled to the tilt sensor and the transmitter;
      wherein the mobile device controller is configured to receive signals from the tilt sensor indicating the attitude of the selected surface on which the handheld mobile device is placed;
      wherein the handheld mobile device is configured to receive a zero-point set command from the user and to send a corresponding zero-point set command signal to the PLA controller via the transmitter and the PLA receiver, and wherein the PLA controller is configured to store an attitude reference value in response to receiving the corresponding zero-point set command signal;
      wherein the system is configured to carry out the automatic leveling process, which includes:
         obtaining a first attitude of the selected surface on which the handheld mobile device is placed, wherein the first attitude of the selected surface is obtained from the tilt sensor of the handheld mobile device;
         generating a leveling device command based on the first attitude of the selected surface on which the handheld mobile device is placed;
         operating at least one of the one or more leveling devices according to the leveling device command;
         after operating the at least one leveling device, obtaining a second attitude of the selected surface on which the handheld mobile device is placed, wherein the second attitude of the selected surface is obtained from the tilt sensor of the handheld mobile device; and
         determining whether the second attitude of the selected surface on which the handheld mobile device is placed indicates that the selected surface is level.

2. The system of claim 1, wherein the handheld mobile device further includes an output device that provides an indication of an attitude of the handheld mobile device.

3. The system of claim 2, wherein the output device is a display configured to visually present information to the user, wherein the mobile device controller is configured to cause one or more graphics to be presented on the display, and wherein the graphic(s) provide a visual indication of the sensed attitude of the selected surface.

4. The system of claim 3, wherein the graphic(s) are part of a virtual bubble level, and wherein the virtual bubble level provides the visual indication of the attitude of the handheld mobile device.

5. The system of claim 2, wherein the output device is a vibrator, and wherein the mobile device controller is configured to provide the indication of the sensed attitude of the selected surface by vibrating when the selected surface is level.

6. The system of claim 1, wherein the PLA further includes a PLA tilt sensor supportable on the structure to be leveled and configured to obtain an attitude of the structure, and wherein the PLA controller is further configured so that, when the automatic leveling device instruction is received from the user, the PLA controller causes the one or more leveling device(s) to be operated so that the attitude of the structure as measured by the PLA tilt sensor corresponds to the stored attitude reference value.

7. The system of claim 6, wherein the attitude reference value is a PLA attitude reference value that is obtained at the PLA controller based on the attitude of the structure as obtained by the PLA tilt sensor.

8. The system of claim 6, wherein the attitude reference value is a mobile attitude reference value that is obtained based on the attitude of the selected surface as obtained by the tilt sensor of the handheld mobile device.

9. The system of claim 6, wherein the attitude reference value is obtained based on the attitude of the selected surface as obtained by the tilt sensor of the handheld mobile device and on the attitude of the structure as obtained by the PLA tilt sensor.

10. The system of claim 9, wherein the attitude reference value is based on a difference between a tilt angle of the attitude of the selected surface as obtained by the tilt sensor of the handheld mobile device and a tilt angle of the attitude of the structure as obtained by the PLA tilt sensor.

11. The system of claim 6, wherein the system is configured to obtain a difference in a first orientation indicated by the tilt sensor of the handheld mobile device and a second orientation indicated by the PLA tilt sensor of the PLA, and to adjust leveling instructions based on the difference between the first orientation and the second orientation.

12. The system of claim 1, wherein the PLA controller is configured to carry out a second iteration of the automatic leveling process in response to, as a part of a first iteration of the automatic leveling process, determining that the second attitude of the selected surface on which the handheld mobile device is placed indicates that the selected surface is not level.

13. A method of leveling a selected surface of a structure, the method comprising:
   (a) obtaining a first attitude of the selected surface on which a handheld mobile device is placed, wherein the first attitude of the selected surface is obtained from a tilt sensor of the handheld mobile device;
   (b) generating a leveling device command based on the first attitude of the selected surface on which the handheld mobile device is placed,
   (c) operating one or more leveling devices attached to the structure according to the leveling device command;
   (d) after operating the one or more leveling devices, obtaining a second attitude of the selected surface on which the handheld mobile device is placed, wherein the second attitude of the selected surface is obtained from the tilt sensor of the handheld mobile device;
   (e) determining whether the selected surface is level based on the second attitude of the selected surface on which the handheld mobile device is placed;
   (f) when it is determined that the selected surface is not level, carrying out another iteration of steps (b)-(e);
   (g) storing an attitude reference value as a zero-point reference value in response to receipt of a zero-point set command from a user; and
   (h) leveling the structure according to the stored zero-point reference value upon receipt of a leveling device instruction.

* * * * *